United States Patent [19]

Schmidt

[11] 4,438,665

[45] Mar. 27, 1984

[54] CONTROL SYSTEM FOR AN AUTOMOBILE DRIVE

[75] Inventor: Dieter Schmidt, Gifhorn, Fed. Rep. of Germany

[73] Assignee: Volkswagenwerk Aktiengesellschaft, Fed. Rep. of Germany

[21] Appl. No.: 242,282

[22] Filed: Mar. 10, 1981

[30] Foreign Application Priority Data

Mar. 19, 1980 [DE] Fed. Rep. of Germany ....... 3010509

[51] Int. Cl.³ .................................................. B60K 41/10
[52] U.S. Cl. ............................................ 74/867; 74/877; 74/731; 74/732; 74/752 C
[58] Field of Search ............... 74/867, 865, 864, 877, 74/752 C, 732, 731

[56] References Cited

U.S. PATENT DOCUMENTS

| | | | |
|---|---|---|---|
| 2,875,643 | 3/1959 | Kelly | 74/752 C |
| 2,934,976 | 5/1960 | Herndon | 74/731 |
| 3,058,373 | 10/1962 | Snoy et al. | 74/732 |
| 3,069,925 | 12/1962 | Roche | 74/865 |
| 3,096,666 | 7/1963 | Christenson et al. | 74/867 |
| 3,602,344 | 8/1971 | Clark | 74/865 |
| 3,859,873 | 1/1975 | Miyauchi et al. | 74/867 |
| 3,897,698 | 8/1975 | Ohsaka | 74/732 |
| 3,924,491 | 12/1975 | Kalversberg | 74/763 |
| 4,095,486 | 6/1978 | Ohnuma | 74/731 |
| 4,313,353 | 2/1982 | Honig | 74/868 |
| 4,331,045 | 5/1982 | Piech et al. | 74/867 |

FOREIGN PATENT DOCUMENTS 2327471 10/1975 Fed. Rep. of Germany.
2833641 2/1980 Fed. Rep. of Germany.

Primary Examiner—Leslie A. Braun
Assistant Examiner—Joseph M. Rolnicki
Attorney, Agent, or Firm—Brumbaugh, Graves, Donohue & Raymond

[57] ABSTRACT

A control system for a hydrodynamic-mechanical transmission of the type having a by-pass clutch to by-pass the hydrodynamic torque converter includes a main control valve to disengage the forward gear clutch element and thereby the engine from the driving wheels when the accelerator pedal is released. At the same time, the main control valves causes the by-pass clutch, if engaged, to disengage. When the accelerator pedal is depressed, the forward gear clutch element re-engages as well as the by-pass clutch, but since the by-pass clutch is still disengaged at the time the forward gear clutch element re-engages, the jerking motion that may otherwise occur is absorbed in the hydrodynamic torque converter.

4 Claims, 2 Drawing Figures

CONTROL SYSTEM FOR AN AUTOMOBILE DRIVE

BACKGROUND OF THE INVENTION

The present invention is an improved control system for a hydrodynamic-mechanical transmission in an automobile which includes one or more hydraulically actuatable gear shift elements. In such transmissions, the drive select lever is coupled to a manual control valve, which delivers a source of first pressurized fluid to the gear select element when the gear select lever is moved to automatic forward drive.

During certain operating states of the vehicle, for example during idling, it is undesirable that the transmission transmit the driving force of the engine to the driving wheels. In commonly owned U.S. Pat. No. 4,331,045, which is incorporated herein by reference, the otherwise engaged gear select elements are selectively disengaged during certain engine operating states by interposing a main control valve in the pressure medium line between the manual control valve and the gear select element. The main control valve may be dependent upon the position of the accelerator pedal to cause disengagement of the gear select elements. The valve both interrupts the delivery of the pressurized fluid from the manual control valve, and at the same time purges the pressure chamber actuating the gear select element, at least when the vehicle is at a stand still, the accelerator pedal is released, and the drive select lever is in the drive position D. Under such conditions, the fluid pressure on the gear select element associated with the forward drive gears is interrupted at least while the accelerator pedal remains released, or provided certain other operating states of the vehicle are not present. For example, a speed-dependent signal of the vehicle can override the interruption of the fluid pressure so that the engine remains coupled through the transmission to the driving wheels when the vehicle is moving.

In accordance with the arrangement, the main control valve prevents the transmission of a creeping moment when the engine idles and a forward gear is engaged (gear select position D), which also prevents vibration of the vehicle caused by transmitting the engine vibrations.

This control system is also suitable for disconnecting the positive connection between the engine and drive gears, for example when the accelerator pedal is released, during the vehicle travel. As such, the vehicle is in an overrun or deceleration mode, that is the wheels drive the engine. When the transmission is disconnected, however, the engine can run at idle. The braking effect of the engine is thereby suspended so that the vehicle, by way of its kinetic energy, travels over longer distances to reduce fuel consumption.

In some hydrodynamic-mechanical transmissions, a by-pass clutch, which is in itself known, is provided to reduce the losses present in a torque converter by by-passing the torque converter during certain vehicle operating states, in particular at higher transmission gears. When the by-pass clutch is actuated, the engine output shaft is connected directly to the mechanical gear train of the transmission, by-passing the hydrodynamic torque converter. However, during vehicle operation states in which the torque converter is by-passed, and there is a rigid rather than fluid coupling of the engine and transmission caused thereby, the engagement and disengagement of the gear control element by the main control valve, for example responsive to the release of the accelerator pedal during vehicle travel, is accompanied by pronounced shifting jerks.

SUMMARY OF THE INVENTION

The present invention is an improved control system for an automobile hydrodynamic-mechanical transmission of the type having a hydrodynamic torque converter and at least one hydraulically actuatable control element for selectively coupling the torque converter to a mechanical planetary gear train. Together with the torque converter, a hydraulically actuatable by-pass clutch is arranged to by-pass the torque converter and to connect directly the engine drive shaft and gear shift element at certain operating states of the automobile. A manual control valve, responsive to the position of the drive select lever, delivers a first pressurized fluid to the control element when the select lever is in the forward drive position. A main control valve, arranged between the manual control valve and the control element, selectively interrupts the delivery of the first pressurized fluid to the control element, to disengage the control element, during selected automobile operating states. Moreover, in accordance with this invention engagement and disengagement of the control elements does not produce jerking of the automobile, even during operating states when the by-pass clutch is engaged for positive connection between the control element and the engine drive shaft, for example during overrun of the traveling vehicle.

More particularly, in a control system in accordance with the invention the main control valve, which is provided for interrupting the flow of pressurized fluid to the control element, for example a forward gear clutch in the transmission, is also arranged to interrupt the delivery of pressurized actuating fluid to the by-pass clutch simultaneously with its actuation to interrupt the supply of fluid to the control element. Due to the fact that the control valve, which interrupts the supply of pressurized fluid to the forward gear clutch element when the accelerator pedal is released, is at the same time employed to interrupt the supply of pressurized fluid to the by-pass clutch, the by-pass clutch, if engaged, is disengaged when the forward gear clutch element is disengaged, and is only re-engaged together with or preferably after the actuation of the clutch element. Thus, when the clutch element is re-engaged, since the by-pass clutch is not yet fully engaged, it is assured that jerks occurring on engagement, in particular when the clutch element is engaged after the overrun operation has been terminated, are absorbed to a large extent elastically by the torque converter which is then still unbridged. Preferably, the system operates so that the renewed engagement of the by-pass clutch occurs shortly after engagement of the clutch element.

In one embodiment, a pressure medium line leading to the by-pass clutch branches off from the pressure admission line between the clutch element and the main control valve. In another embodiment, a by-pass control valve controls the pressure to the by-pass clutch. The by-pass control valve is in turn controlled by a pressure line branching off from the pressure line between the clutch element and main control valve. In a modification of this latter embodiment, a reversing valve is interposed in the pressure admission line between the main control valve and the by-pass control valve which is responsive to a vehicle speed-dependent pressure.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
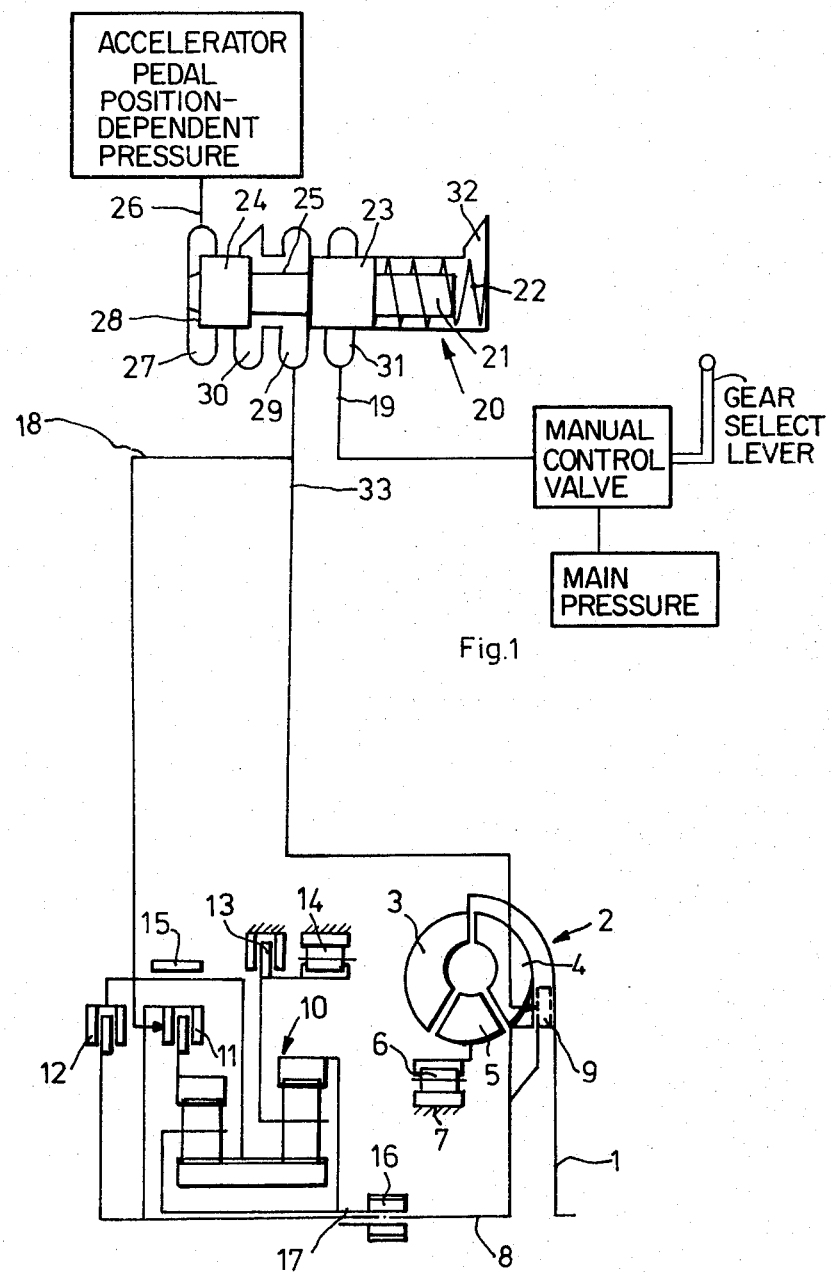
FIG. 1 is a schematic representation of a first embodiment of the invention.

Referring to the drawings, in which like numerals designate comparable elements, an automobile engine has a crankshaft 1 connected via a hydrodynamic torque converter 2 with a mechanical planetary gear train 10. A plurality of control elements 11, 12, 13, 14, and 15 produce an output with variably adjustable gear ratios to the output drive shaft 17 and output pinion 16. The control elements are selectively actuated to produce the desired output to the output drive shaft 17.

Torque convertor 2 is provided with a pump wheel 3 connected to the crankshaft 1, as well as a turbine wheel 4 which is driven by the pump wheel 3. The turbine wheel 4 is coupled to a turbine shaft 8 connected in turn with the input of the planetary gear train 10. The torque convertor 2 also includes a guide wheel 5 which by way of an override clutch 6 is supported relative to the housing 7. A hydraulically actuatable by-pass clutch 9 upon actuation connects directly the crankshaft 1 with the turbine shaft 8 to by-pass the pump wheel 3, so that the torque converter 2 which operates the slippage is by-passed.

For the purpose of producing the various gear configurations, a forward gear clutch 11, a direct reverse clutch 12, a multiple-disc brake 13 and a band brake 15 are provided. These various control elements are actuated by transmission controls not shown and together with the free-wheeling mechanism 14 form the individual gear stages. A transmission of this type is shown, for example, in German Pat. No. 23 27 471, and in U.S. Pat. No. 3,924,491 to Kalversberg, respectively.

A main control valve 20 is connected to the transmission 10 via a pressure medium line 18. The main control valve 20 is similar to that shown and described in U.S. Pat. No. 4,331,045, incorporated herein by reference. For the purposes of the present invention, a somewhat simplified construction is illustrated. A valve piston 21 with two piston collars 23 and 24 is loaded on its right side by a spring 22. The left-end face 28 of the valve piston 21 is acted on by a pressure prevailing in the pressure admission chamber 27, the pressure being conveyed from pressure line 26. Preferably, the pressure provided at chamber 27 is accelerator-dependent such that when the accelerator pedal is released, the pressure in chamber 27 is substantially atmospheric pressure. At other accelerator positions, the pressure from line 26 corresponds essentially to the so-called gas pedal position dependent pressure employed in other points of the transmission control (which is higher than atmospheric pressure). Thus, when the accelerator pedal is depressed, the piston 21 moves to the right from its position shown in FIG. 1. Embodiments of a device for supplying such an accelerator pedal position-dependent hydraulic pressure are shown in U.S. Pat. No. 4,331,045.

The main control valve 20 is inserted in a pressure line 18, 19 between the control element 11 (forward gear clutch element) of the planetary gear train 10 and a manual control valve. When the accelerator pedal is depressed, and therefore valve piston 21 moves to the right, chambers 31 and 29, communicating with pressure lines 19 and 18, respectively, are connected over the piston step 25 between the shoulder portions 23 and 24. Accordingly, pressure from the manual control valve from line 19 is transmitted through the main control valve 20 to the pressure line 18 leading to the forward gear clutch element 11. When the accelerator pedal is released, however, and piston 21 moves to the left (i.e. the FIG. 1 position) the chamber 29, and thereby line 18, communicate with chamber 30 connected to atmospheric pressure. The connection 32 also communicates with atmosphere pressure, to permit the valve 21 to move longitudinally back and forth.

In the FIG. 1 embodiment, a pressure admission line 33 branches off from the pressure admission line 18 between the control element 11 and the main control valve 20. The pressure admission line 33 leads directly to the by-pass clutch 9 of the torque converter 2. Thus, as shown in the drawing, when the accelerator pedal is released, and valve 21 is moved to the left by spring 22, both lines 18 and 33 are vented from chambers 29 to 30, thereby to atmosphere, over step 25. Thus, both the forward clutch element 11 as well as the by-pass clutch 9 are vented and disengage, e.g. by aid of springs (not shown).

When the accelerator pedal is depressed, and pressure in line 26 and chamber 27 increase, the piston 21 moves to the right against the force of spring 22, and again connects chambers 29 and 31. Pressurized fluid in line 19 from the manual control valve thereby communicates to lines 18 and 33 to the forward clutch element 11 and by-pass clutch 9, respectively. But the hydraulic system is designed so that the engagement of the by-pass clutch 9 occurs shortly after the engagement of the forward clutch 11, e.g. by an appropriate construction of the clutches or by providing hydraulic delay means, such as accumulator or throttling means (not shown) in line 33 to the by-pass clutch 9. Thus the shifting jerk which occurs when the clutch element 11 engages, which but for the fact that the by-pass clutch 9 is disengaged would be transmitted rigidly to drive shaft 1, is substantially absorbed elastically by the torque converter in the pump wheel 3 and turbine wheel 4.

Figure 2:
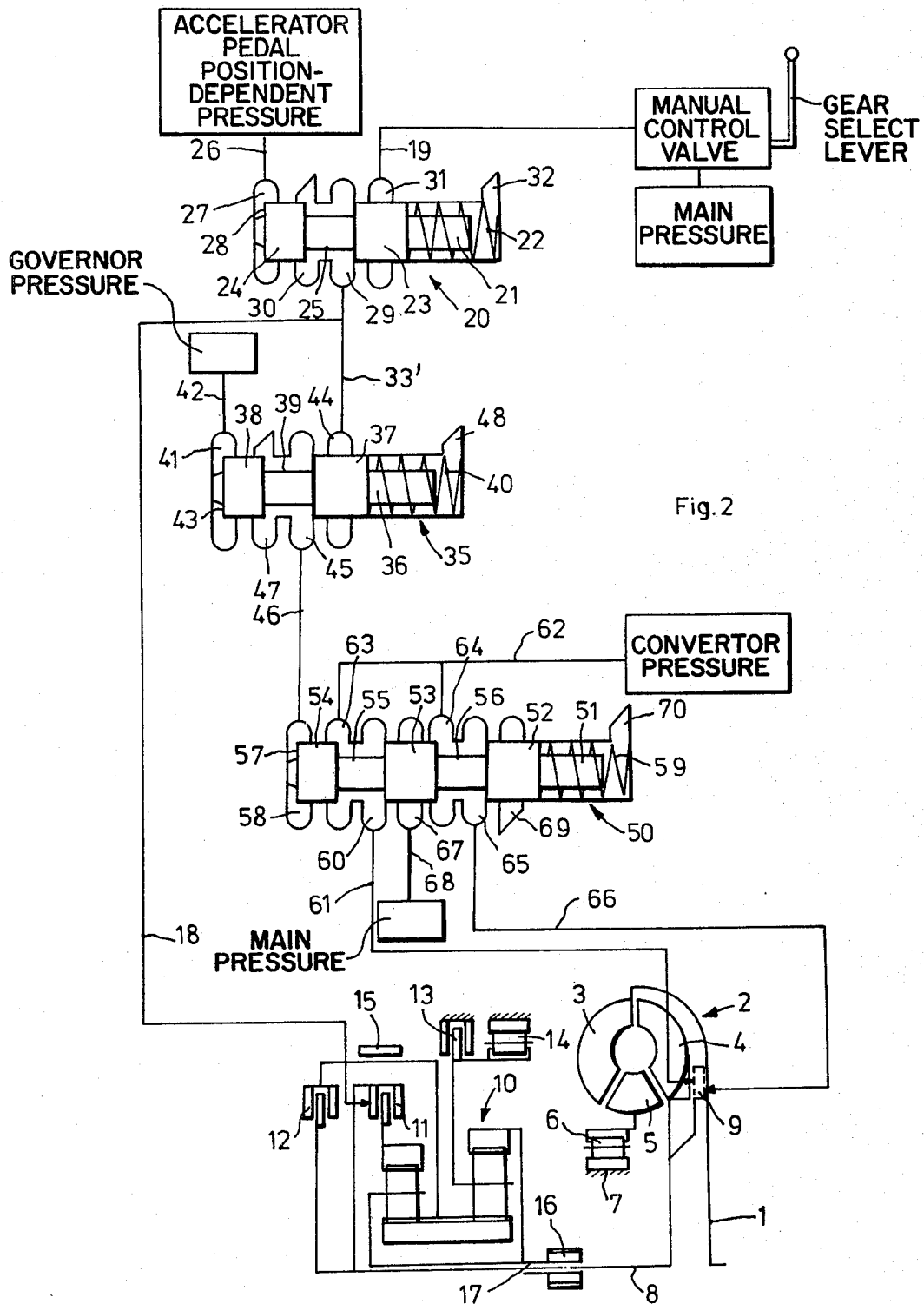
FIG. 2 is a schematic representation of a second embodiment of the invention.

A second embodiment of the invention is shown in FIG. 2. In this embodiment, a main control valve 20 is also interposed between line 19 from the manual control valve and the forward clutch element 11 of the transmission 10. A pressure line 33 branches off the pressure admission line 18, 19 leading to the forward clutch element 11, but unlike the FIG. 1 embodiment does not act directly on the engagement side of the by-pass clutch 9. Instead, the prevailing pressure in the line 33 is employed to control a by-pass clutch control valve 50. The by-pass control valve 50, in turn, controls the pressure action on the by-pass clutch 9.

The by-pass clutch valve 50 has a piston valve 51 with three piston collars 52, 53 and 54 and interposed piston steps 55 and 56. The piston valve 51 also is loaded on its right-end face by a spring 59, and on its left-end face 57 by a control pressure conveyed via a line 46 to the pressure chamber 58. The by-pass control valve 50 has a chamber 60 communicating with pressure line 61 leading to the engagement side of the by-pass clutch 9. Two chambers 63 and 64 receive a converter pressure, which is employed in conventional by-pass clutch controls, via a line 62 and a chamber 65 communicates with line 66 leading to the disengagement side of the by-pass clutch 9. A chamber 67 communicates with line 68 supplying a main pressurized fluid and outlet connections 69 and 70 communicate with atmosphere.

As disclosed in the aforementioned U.S. Pat. No. 4,331,045, the manual control valve, which selectively supplies pressurized fluid to line 19 (i.e., when the gear select lever of the manual control valve is in "Drive" or one of the other forward gear positions), is preferably connected to a source of main pressurized fluid, available in conventional transmission controls. Line 68, which as noted above also provides a main pressurized fluid, may be connected to the same source. However, the particular source of pressurized fluid supplied to line 68 does not matter as long as, when the line 68 is connected to line 61, the pressure supplied to line 61 is sufficient to engage the by-pass clutch 9 as described above.

The pressure line 46 leads from the by-pass control valve 50 to a control valve 35 controlled as a function of vehicle speed. The speed-dependent valve 35 is provided with a piston slide 36 with two piston collars 37 and 38, and an interposed piston step 39. A return spring 40 biases the right-end face of piston 36, and the left-end face 43 of the piston 36 is loaded by the pressure prevailing in the chamber 41 supplied via the line 42. Line 42, in turn, is supplied with a vehicle speed-dependent pressure, the so-called regulator or governor. A chamber 45 in valve 35 communicates with control pressure line 46 leading to the by-pass control valve 50, and a chamber 44 communicates with the pressure line 33' leading to the main control valve 20. Finally, outlets 47 and 48 communicate with atmosphere.

In the case of the embodiment illustrated in FIG. 2, the main control valve 20 controls, with the interposition of a vehicle speed dependent control valve 35, the by-pass control valve 50.

When the vehicle is moving above a selected minimum speed, pressure in line 42 causes piston 36 to move to the right, and pressure lines 33' and 46 communicate across the valve 35. When the accelerator pedal is released, for example during vehicle overrun operation, lines 18, 33' and 46 are vented, and the forward clutch element 11 and by-pass clutch 9 disengage. When the accelerator pedal is depressed, control valve 20 is actuated, and piston 21 moves to the right to connect line 19 and 18. Pressurized fluid from the manual control valve is thereby delivered to the forward clutch element 11. The pressure line 33', which branches off the pressure line 18, as well as the coupled line 46, also receive the pressurized fluid and displace piston 51 of the by-pass control valve 50 to the right from its position shown in the drawing. As a result of the displacement of the piston 51, chamber 60 of by-pass control valve 50 and thereby pressure line 61 leading to the engagement side of the by-pass clutch 9 communicate with chamber 67 from the main pressure line 68, and the pressured fluid from line 68 actuates the by-pass clutch. Simultaneously, the chamber 65, connected to the pressure line 66 from the disengagement side of the by-pass clutch, communicates with chamber 69 leading to atmosphere, and is thereby vented. Accordingly, the by-pass clutch is engaged for circumventing the torque converter 2.

However, as shown in FIG. 2 the main pressure is transmitted via the lines 33' and 46 to the left-end face 57 of the piston 51 of the by-pass control valve 50 only when the vehicle travels at a sufficiently high speed, i.e. a speed sufficient so that the speed dependent pressure in line 42 moves the control valve piston 36 from the position shown in the drawing toward the right, such that chambers 45 and 44 are joined via the piston step 39. By way of example, the return spring 40 of the speed dependent control valve 35 may be dimensioned so that the switching occurs at a speed of approximately 40 km/h. As a result, the by-pass clutch is engaged only when the vehicle travels above a pre-determined speed where it is desireable to by-pass the torque converter to avoid the converter losses. At lower speeds, on the other hand, the effect of the torque converter as a cushioning element is maintained in the tractive section. At travel speeds below the set value or at releasing the accelerator pedal, the piston 51 of the by-pass control valve 50 remains in the position shown in FIG. 2, in which the two sides of the by-pass clutch, by way of pressure lines 61 and 66, both connected to the converter pressure line 62, are acted on by equal pressures. This equalization of pressure on both pressure action sides of the by-pass clutch results in the disengagement of the by-pass clutch by means of not shown springs so that the crankshaft 1 is connected with the turbine shaft 8 only by the torque converter 2 (pump wheel 3 and turbine wheel 4).

The foregoing represent the preferred embodiments of the invention. Variations and modifications of the control system shown and described above will be apparent to persons skilled in the art, without departing from the inventive principles disclosed herein. For example, the main control valve 20 may be acted on by additional control factors. As described in commonly owned U.S. Pat. No. 4,313,353, which is incorporated herein by reference, the main control valve 20 may be acted on by a speed-dependent, or brake-pedal position dependent pressure. Also, the control element need not necessarily be a forward gear clutch element, but may be any other control element which is engaged in the transmission gears operable during overrun conditions. All such modifications and variations are intended to be within the scope of the present invention as defined in the following claims.

I claim:

1. In combination a hydrodynamic-mechanical transmission and a control system therefor, for use in an automobile having an accelerator pedal, a drive select lever having a plurality of positions, including forward drive, a source of first pressurized fluid, and a manual control valve, responsive to the position of said lever, for selectively delivering said first fluid when said select lever is in the forward drive position, wherein said transmission comprises:
 (a) a hydrodynamic torque converter having a hydraulically actuatable by-pass clutch;
 (b) a mechanical planetary gear train; and
 (c) at least one hydraulically actuatable control element for selectively coupling said torque converter and said gear train; and wherein said control system comprises:
  (i) a first pressure medium line adapted to be connected to said manual control valve for receiving said first pressurized fluid and communicating with said control element for supplying said first pressurized fluid to said element for actuating said control element, (ii) a main control valve means arranged in said first pressure medium line for selectively interrupting the delivery of said first fluid to said control element, (iii) means responsive to at least one automobile operating parameter for actuating said main control valve means, and (iv) means for delivering a pressurized fluid to said by-pass clutch for selectively actuating said by-pass clutch, wherein the means for delivering pressurized fluid to said by-pass clutch are responsive to the actuation of said main control valve means for interrupting the delivery of pressurized fluid to said by-pass clutch when said main control valve means is actuated.

2. The combination as defined in claim 1, wherein the means for delivering pressurized fluid to said by-pass clutch comprise a second pressure medium line communicating between said by-pass clutch and said first pressure medium line, said second pressure medium line being connected to said first pressure medium line at a point located between said main control valve means and said control element, wherein the actuation of said main control valve interrupts the delivery of pressurized fluid to said second pressure medium line and thereby to said by-pass clutch.

3. The combination as defined in claim 1, wherein the means for delivering a pressurized fluid to said by-pass clutch comprise a by-pass clutch control valve, communicating with said by-pass clutch, wherein said by-pass clutch control valve is arranged to selectively interrupt the delivery of pressurized fluid to said by-pass clutch, and further comprise a second pressure medium line communicating between said first pressure line, between said main control valve means and said control element, and said by-pass clutch control valve for delivering a control pressure to said by-pass control valve for actuating said by-pass control valve.

4. The combination as defined in claim 3, comprising a speed dependent valve interposed in said second pressure medium line for selectively interrupting the delivery of said control pressure.

* * * * *